Oct. 16, 1934.   F. E. VAUGHAN   1,977,027
OPTICAL SYSTEM FOR INDICATING ANGULAR DEFLECTION
Filed Jan. 16, 1933
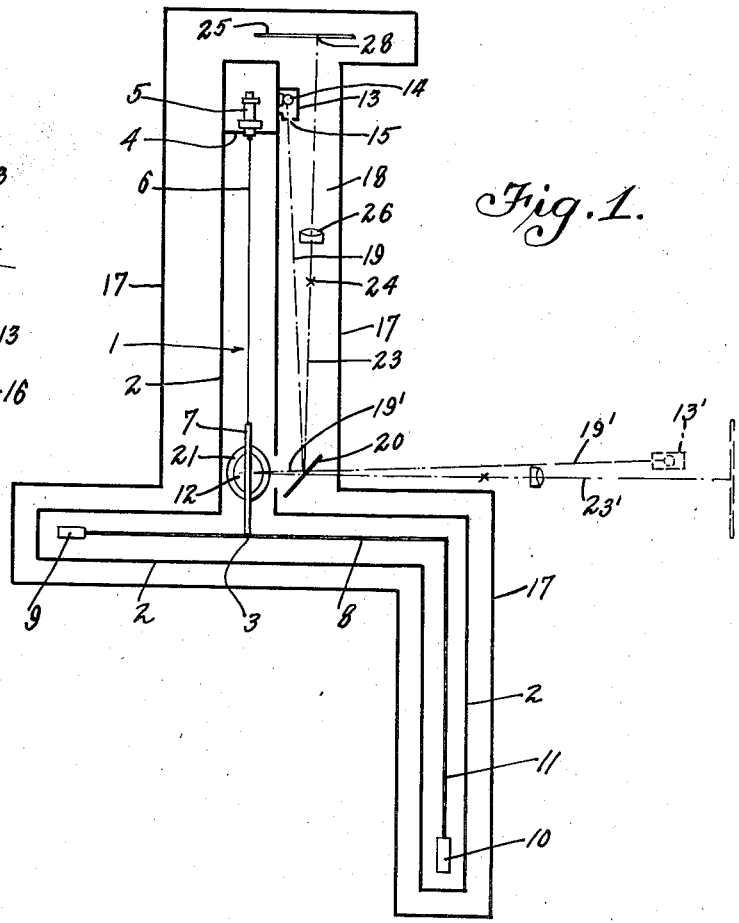
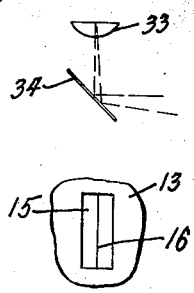
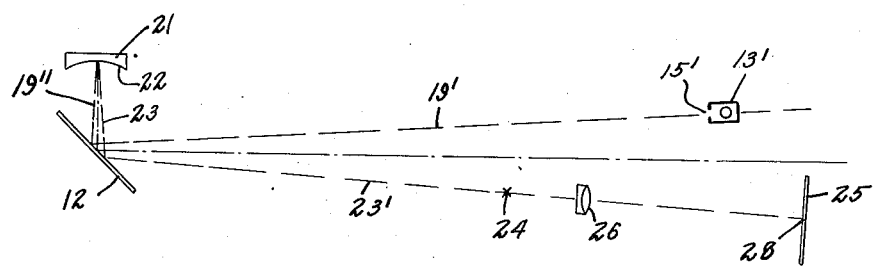
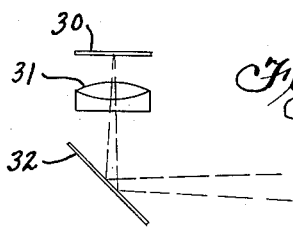
Inventor
Francis E. Vaughan
By Lyon & Lyon
Attorneys Patented Oct. 16, 1934

1,977,027

UNITED STATES PATENT OFFICE 1,977,027

OPTICAL SYSTEM FOR INDICATING ANGULAR DEFLECTION

Francis E. Vaughan, Altadena, Calif.

Application January 16, 1933, Serial No. 651,913

22 Claims. (Cl. 88—24)

This invention relates to an optical system for indicating angular deflection.

It is an object of this invention to provide an optical system for accurately indicating the angular deflection of the active member of a torsion balance, galvanometer, or of other instruments or devices.

A further object is to provide an optical system operative for greatly magnifying without distortion, the angular deflection of an object.

A further object is to provide an optical system operative for greatly magnifying the deflection of the image.

A further object is to provide an optical system which may be simple and compact, and which system may be used in conjunction with a torsion balance for accurately measuring the angular deflections of the beam mirror thereof.

A further object is to provide an optical system for indicating angular deflection, in which system the resultant image will be entirely free of chromatic and spherical aberration.

A further object is to provide an optical system for indicating angular deflection by means of a movable plane beam mirror and a fixed concave mirror arranged so that the beam of light will be deflected through an angle four times as great as the angular deflection of the beam mirror, and by so arranging the beam and concave mirrors, the image formed at the focal point will be brilliantly illuminated and free from chromatic or spherical aberrations, at which point a plate or other image viewing means may be provided.

A further object is to provide an optical system for indicating angular deflection with magnifying means having one of its conjugate foci coincident with the focal point of the light beam received from the system of mirrors including a movable plane mirror and a fixed concave mirror, and for also providing a suitable plate or other image-viewing means located substantially at other focal points of the magnifying means.

A further object is to provide an optical system for indicating angular deflection including a concave mirror having an ellipsoidal surface, the geometric foci of which are coincident with the optical conjugate foci thereof.

A further object is to provide an optical system for indicating angular deflections including a concave mirror and providing a light source at one of a pair of the conjugate foci of the concave mirror, and a plate or other image-viewing means at the other of said foci.

A further object is to provide an optical system for indicating angular deflections with a light source of any desired shape or configuration.

A further object is to provide an optical system for indicating angular deflections in which system the plane mirror and the concave mirror may be of relatively large diameters so as to admit sufficient light for brilliant illumination of the image.

A further object is to provide an optical system for indicating angular deflections and for providing such a system with a light sensitive means for recording such angular deflections.

A further object is to locate the plain mirror upon the suspension system so that the plain mirror may be shifted or moved in a vertical plane due to the expansion or contraction of the fine supporting wire, or due to other causes, without affecting or displacing the position of the image.

Other objects and advantages of the invention will become apparent as the nature of the same is more fully understood from the following description and accompanying drawing wherein is set forth what is now considered to be a preferred embodiment. It should be understood, however, that this particular embodiment of the invention is chosen principally for the purpose of exemplification, and that variations therefrom in details of construction or arrangement of parts, may accordingly be effected and yet remain within the spirit and scope of the invention as the same is set forth in the appended claims.

In the drawing:

Figure 1 illustrates a diagrammatic representation of a standard form of torsion balance with a diagrammatic representation of the invention applied thereto.

Figure 2 illustrates a diagrammatic representation of a development of the invention illustrated in Fig. 1.

Figures 3 and 4 illustrate diagrammatic representations of modified forms of the invention.

Figure 5 illustrates one form of opening through the lamp-house.

In Figure 1 of the drawing, the preferred form of the invention has been illustrated in combination with a torsion balance, but it is to be understood that the invention may be practiced in conjunction with galvanometers or other types or forms of devices where it is desirable to accurately indicate and measure angular deflections or movements of very small magnitudes. The torsion balance per se, as illustrated in Figure 1, forms no part of this invention as instruments of this character have been used for many years for making gravimetric measurements, and no claim therefore, is made herein.

The torsion balance 1 may include an inner housing 2 for enclosing and supporting a suspended system 3. The suspended system 3 may be supported in the housing as by means of the bridge member 4 provided with a torsion head 5 by which the upper end of fine wire 6 may be suspended and controlled. The lower end of wire 6 may be suitably fastened to the upper end of a balance column 7, and a light aluminum beam 8 may be suitably mounted upon the lower end of balance column 7. To one end of beam 8 may be mounted a weight 9, while to the opposite end of beam 8 may be suspended a weight 10 by means of wire 11. The beam 8 with its weights 9 and 10, is in substantially perfect balance, and is freely suspended by means of wire 6, and thus is free to rotate. A plane mirror 12 may be suitably mounted upon column 7 so as to be rotated or deflected therewith.

An optical system may be provided which will accurately indicate the slightest rotation, which, in this specification, will be referred to as deflection of the suspended system. The optical system may include a lamp-house 13 for encasing a source of light 14, which source of light may be a small electric globe, and the lamp-house may be provided with an opening 15 of any desired shape, as for example, a rectangular opening across the center of which a fine hair 16 may be mounted, as illustrated in Fig. 5. The inner housing 2 may be enclosed in an appropriately shaped outer housing 17, and the lamp-house 13 may be mounted upon the inner housing 2 or the outer housing 17, but within the space 18 formed between the two housings. To divert the light beam 19 from its nearly vertical path to its substantially horizontal path 19', an inclined mirror 20 may be mounted in space 18, to either or both of the housings. The inclined mirror performs no other purpose than that of diverting the light beam 19, as for example, the light-house 13 may be mounted as indicated in broken lines at 13' of Fig. 1, and the inclined mirror entirely disposed of. However, for the sake of compactness, it is desirable to provide the optical system of a torsion balance with the inclined mirror.

An optical system which does not include the inclined mirror 20 is diagrammatically illustrated in plan in Figure 2, and as this figure more clearly illustrates the system, the description thereof will be made with reference to this figure. In Figure 2 the light beam 19' is projected from the lamp-house 13' and impinges upon the plane mirror 12, which mirror, as previously stated, may be mounted upon the suspended structure 3 so as to be deflected therewith. The movable plane mirror 12 may be positioned at any desired angle with relation to the light beam 19', as for example, 45° so that the light beam 19' may be reflected as beam 19" at right angles to light beam 19'. A fixed mirror 21 having an appropriately shaped concave reflecting surface 22 may be suitably mounted in the inner housing and positioned to intercept the light beam 19" and reflect back the light beam 23 at a very slight angle to the light beam 19", due to either the curvature, and/or positioning of the concave mirror surface 22 so that the light beam will strike and reflect from the movable plane mirror 12, as indicated by the light beam 23'. The curvature of the concave mirror surface 22 may be of ellipsoidal figure, having its geometric foci equal to its optical conjugate foci, and by placing the lamp-house opening 15' at one focal point and an image-receiving plate at the other focal point 24, spherical aberration of the image received upon the plate, will be entirely eliminated. Also, by using the mirror combination, chromatic aberrations of the image projected upon the image plate will also be entirely eliminated. Therefore, the mirrors 12 and 22 may be of relatively large diameters in order to admit sufficient light for the brilliant illumination of the image at 24. Instead of placing the image plate 25 at the focal point 24, it may be desirable to space the image plate from the focal point 24 and introduce a deflection magnifying means therebetween, as for example, a lens system 26 having conjugate foci 24 and 28, the former coincident with the focal point 24, and the latter at the location of the image plate 25. As is well understood, the lens system 26 will magnify the deflection of the image received at the focal point 24 in the ratio of distance from lens 26 to the image plate 25 divided by the distance from the lens 26 to the focal point 24. As for example, should the distance between lens 26 and plate 25 be four units while the distance from lens 26 to the focal point 24 be two units, then by dividing 4 by 2, a resulting magnification of 2 will be obtained. Thus a double magnification of the amount of deflection of beam 23' at point 28 will be obtained as compared with the deflection of beam 23' at focal point 24. In other words, the deflection at 28 would be twice that at 24. The image produced upon plate 25 by the lens system, is magnified by the ratio of the lens system as above explained, and therefore, it is particularly desirable that the image at 24 be free of imperfections, as these too, would be magnified in the same ratio.

Now consider the effect of a small rotational deflection of the movable mirror 12, which, for convenience, may be designated angle "A". The rotation or deflection of mirror 12 is about a vertical axis and lies in the plane of the drawing as viewed in Figure 1, and normal to the plane of the drawing as viewed in Figure 2. The axis of deflection as illustrated in Figure 1, is about the axis determined by the suspending wire 6 and the balance column 7. The light from the opening 15' of light-house 13', that is, light beam 19', will be deflected, due to the deflection of mirror 12, through twice the angle of deflection of mirror 12. That is, if the mirror 12 is deflected through angle "A", the reflection 19" of the light beam 19' will be deflected through an angle of twice that magnitude, or "2A". The concave mirror surface 22 will return the deflected light beam to mirror 12, where the beam will be again deflected through an angle of "2A" or twice the angular deflection of the mirror 12; thus the resultant beam will be deflected through a total of four times the angular deflection of the mirror 12 or "4A". Thus, any angular deflection of the mirror 12 will be indicated by a greatly magnified motion of the image at the focal point 24 of the concave mirror, which great magnification may be further magnified by the lens system 26 as previously described, and finally the image will be projected upon the plate 25 and by measuring the distance of travel of the image upon this plate, the degree of angular deflection of the beam may be accurately calculated.

It is therefore obvious that small deflections of the beam can be determined very precisely by measuring the relatively great movement of the image at the image plate 25. In practice this may be accomplished by substituting for the image plate a plate sensitive to light such as a photographic plate upon which the image may be recorded for each reading; then by measuring the distances on the plate by means of either a ruled glass scale, or a measuring microscope, the angular deflection of the mirror 12 may be accurately determined.

Some of the principal advantages of the arrangement described are: The relatively great movement of the image upon the image plate as compared to the relatively small angular deflection of the mirror 12; the sharp definition and brilliant illumination of this image which renders positive and accurate measurements of its positions; the simplicity of the construction of the optical parts; the compactness of the entire optical system, and the entire elimination of chromatic and/or spherical aberrations.

These advantages flow largely from the fact that the mirror 21 performs two functions, it acts as a fixed auxiliary to the moving mirror 12 in such a manner that the beam reflected back from the combination, the beam 23' is deflected through an angle four times as great as that through which the mirror 12 is itself deflected; it forms at 24 a brilliantly illuminated image, free from chromatic and/or spherical aberrations, which can be greatly magnified, this magnified image being well illuminated and sharply defined.

In Figure 3 a partial modification of the invention is diagrammatically represented as including in place of the concave mirror, a flat plane mirror 30 and a lens system 31. This modification has the inherent disadvantage that no lens can produce an image so brilliantly illuminated and sharply defined, as produced by a mirror, and moreover, is much more difficult to construct. The movable plane mirror is indicated at 32, and the remaining portion of the optical system may remain unchanged.

By positioning the lens system between the movable and fixed mirrors, as illustrated in Fig. 3, chromatic and other aberrations of the lens system will be magnified by a less amount than would be the case, should the lens system be positioned between the light source and the movable mirror. This important advantage is obtained because the light beam will have been reflected from the movable mirror before passing through the lens system so that chromatic and other aberrations of the lens system will have less magnification while passing through the system of mirrors.

In Figure 4 a further modification of this plane mirror lens system is illustrated as including a plano-convex lens 33 silvered on the plane side and arranged so that the convex side faces the movable plane mirror 34. This modification has also the inherent disadvantages as set forth for the modification illustrated in Fig. 3.

Although such a combination of a plane mirror and lens system is far inferior to the concave mirror, it is still superior to any arrangement now in use.

Having fully described the invention, it is to be understood that it is not to be limited to the details herein set forth, but the invention is of the full scope of the appended claims.

I claim:

1. In an optical system for indicating angular deflection, a light source, a plane mirror movably mounted and positioned to intercept in angular relation the light beam projected from said source, a fixed concave mirror positioned to receive and to reflect back the light beam to said plane mirror, said light source located at one of a pair of conjugate foci of the concave mirror, and a screen means located at the other conjugate focus of the concave mirror.

2. In an optical system for indicating angular deflection, a light source, a plane mirror movably mounted and positioned to intercept at an angle of 45° the light beam projected from said light source, a fixed concave mirror positioned to receive and to reflect back the light beam to the plane mirror, said light source being located at one of a pair of conjugate foci of the concave mirror, and screen means located at the other conjugate focus of the concave mirror.

3. In an optical system for indicating angular deflection, a light source, a plane mirror movably mounted and positioned to intercept in angular relation the light beam projected from said light source, a fixed concave mirror positioned to receive and to reflect the light beam back to said plane mirror, said light source located at one of a pair of conjugate foci of the concave mirror, and means for magnifying the angular deflection of the light beam located at the other conjugate focus of said concave mirror.

4. In an optical system for indicating angular deflection, a light source, a plane mirror movably mounted and positioned to intercept in angular relation the light beam projected from said light source, a fixed concave mirror positioned to receive and to reflect the light beam back to the plane mirror, said light source located at one of a pair of conjugate foci of the concave mirror, and a lens system arranged for magnifying the angular deflection of the light beam.

5. In an optical system for indicating angular deflection, a light source, a plane mirror movably mounted and normally positioned to intercept in angular relation the light beam projected from said light source, a fixed concave mirror positioned to receive and to reflect the light beam back to the plane mirror, said light source located at one of a pair of the conjugate foci of the concave mirror, a lens system arranged for magnifying the angular deflections of the light beam and having one of a pair of its conjugate foci coincident with the other conjugate focus of said concave mirror, and a screen means located at the other conjugate foci of said lens system.

6. In an optical system for indicating angular deflection, a light source, a plane mirror movably mounted and positioned to intercept in angular relation the light beam projected from said light source, a fixed concave ellipsoidal mirror having its geometric foci coincident with the optical foci thereof and positioned to receive and to reflect the light beam back to the plane mirror, said light source located at one of the foci of the said ellipsoidal mirror, and a screen means located at the other foci of said ellipsoidal mirror.

7. In an optical system for indicating angular deflection, a light source, a plane mirror movably mounted and positioned to intercept in angular relation the light beam projected from said light source, a fixed concave ellipsoidal mirror the geometric foci of which coincide with the optical conjugate foci thereof and positioned to receive and to reflect the light beam back to the plane mirror, said light source located at one of a pair of conjugate foci of the said ellipsoidal mirror, a lens system arranged for magnifying the angular deflections of the light beam and having one of a pair of its conjugate foci coincident with the other conjugate focus of said ellipsoidal mirror, and a screen means located at the other conjugate focus of said lens system.

8. In an optical system for recording angular deflection, a light source, a plane mirror movably mounted and normally positioned to intercept in angular relation the light beam projected from said light source, a fixed concave mirror positioned to receive and to reflect the light beam back to said plane mirror, said light source located at one of a pair of conjugate foci of the concave mirror, and a light sensitive means for recording an image located at the other conjugate focus of the concave mirror.

9. In an optical system for recording angular deflection, a light source, a plane mirror movably mounted and positioned to intercept in angular relation the light beam projected from said light source, a fixed concave mirror positioned to receive and to reflect the light beam back to the plane mirror, said light source located at one of a pair of conjugate foci of the concave mirror, a lens system arranged for magnifying the angular deflection of the light beam and having one of a pair of its conjugate foci coincident with the other conjugate focus of said concave mirror, and a light sensitive means for recording an image located at the other conjugate focus of said lens system.

10. In an optical system for indicating angular deflection, a light source, a plane mirror movably mounted and positioned to intercept in angular relation the light beam projected from said light source, a fixed plano-convex lens system silvered on the plane side and having its convex side facing the movable plane mirror, said light source located at one of a pair of conjugate foci of the plano-convex lens, and a screen means located at the other conjugate focus of the concave mirror.

11. In an optical system for indicating angular deflection, a light source, a first plane mirror movably mounted and positioned to intercept in angular relation the light beam projected from said light source, a second plane mirror fixedly mounted and spaced from the first plane mirror, a lens system located between said first and second mirrors, said light source located at one of a pair of conjugate foci of said lens mirror system, and a screen means located at the other of the conjugate foci of said lens system.

12. In an optical system for indicating angular deflection, a light source, a first plane mirror movably mounted and positioned to intercept in angular relation the light beam projected from said light source, a second plane mirror fixedly mounted and spaced from the first plane mirror, a first lens system located between said first and second mirrors, said light source located at one of a pair of conjugate foci of said first lens system, a second lens system arranged for magnifying the deflections of the image and having one of a pair of its conjugate foci coincident with the other conjugate focus of said first lens system, and a screen means located at the other conjugate foci of said second lens system.

13. In an optical system for indicating angular deflection, a light source, a plane mirror movably mounted and positioned to intercept in angular relation the light beam projected from said source, a fixed concave mirror positioned to receive and to reflect back the light beam to the said plane mirror, and said light source located at one of a pair of conjugate foci of the concave mirror.

14. In an optical system for indicating angular deflection, a light source, a plane mirror movably mounted and positioned to intercept in angular relation the light beam projected from said light source, a fixed concave mirror positioned to receive and to reflect back the light beam to the said plane mirror, said light source located at one of a pair of conjugate foci of the concave mirror, and means for viewing the real image at the other conjugate focus of the concave mirror.

15. In an optical system for indicating angular deflection, a source of light, a plane mirror movably mounted and positioned to intercept in angular relation the light beam projected from said light source, a fixed concave mirror positioned to receive and to reflect the light beam back to said plane mirror, said light source located at one of a pair of conjugate foci of the concave mirror, and means for magnifying the image of said light source located at the conjugate focus of said concave mirror.

16. In an optical system for indicating angular deflection, a source of light, a plane mirror movably mounted and positioned to intercept in angular relation the light beam projected from said light source, a fixed concave mirror positioned to receive and to reflect the light beam back to said plane mirror, said light source located at one of a pair of conjugate foci of the concave mirror, and a lens system for magnifying the image of said light source.

17. In an optical system for indicating angular deflection, a light source, a plane mirror movably mounted and positioned to intercept in angular relation the light beam projected from said light source, a fixed concave ellipsoidal mirror having its geometric foci coincident with its optical foci and positioned to receive and to reflect the light beam back to the plane mirror, said light source located at one of a pair of conjugate foci of the ellipsoidal mirror, and means for viewing the real image located at the other of said conjugate foci of said ellipsoidal mirror.

18. In an optical system for indicating angular deflection, a light source, a plane mirror movably mounted and positioned to intercept in angular relation the light beam projected from said light source, a fixed concave ellipsoidal mirror having its geometric foci coincident with its optical foci and positioned to receive and to reflect the light beam back to the plane mirror, said light source located at one focal point of said ellipsoidal mirror, a lens system arranged for magnifying the deflection of the image having one of a pair of its conjugate foci coincident with the other focal point of said ellipsoidal mirror, and means for viewing the real image located at the other conjugate focus of said lens system.

19. In an optical system for recording angular deflection, a light source, a plane mirror movably mounted and positioned to intercept the light beam projected from said light source, a fixed concave mirror positioned to receive and to reflect the light beam back to the plane mirror, said light source located at one of a pair of conjugate foci of the concave mirror, a lens system arranged for magnifying the deflection of the image and having one of a pair of its conjugate foci coincident with the other conjugate focus of said concave mirror, and a light sensitive means for recording an image located at the other conjugate focus of said lens system.

20. In an optical system for indicating angular deflection, a light source, a first plane mirror movably mounted and positioned to intercept in angular relation the light beam projected from said light source, a second plane mirror fixedly mounted and spaced from the first plane mirror, a first lens system located between said first and second mirrors, said light source located at one of a pair of conjugate foci of the lens system, and means for viewing the real image located at the other conjugate focus of said lens system.

21. In an optical system for indicating angular deflection, a light source, a plane mirror movably mounted and positioned to intercept in angular relation the light beam projecting from said source, a fixed light converging and reflecting means positioned to receive and to reflect back the light beam to said plane mirror, said light source located at one of a pair of conjugate foci of the light converging and reflecting means, and a screen means located at the other conjugate focus of the light converging and reflecting means.

22. In an optical system for indicating angular deflection, a light source, a plane mirror movably mounted and positioned to intercept in angular relation the light beam projected from said source, a light converging and reflecting means positioned to receive and to reflect back the light beam to said plane mirror and said light source located at one of a pair of conjugate foci of the light converging and reflecting means.

FRANCIS E. VAUGHAN.